United States Patent

[11] 3,593,273

| [72] | Inventor | Rudor M. Teich<br>Union City, N.J. |
|---|---|---|
| [21] | Appl. No. | 790,968 |
| [22] | Filed | Jan. 14, 1969 |
| [45] | Patented | July 13, 1971 |
| [73] | Assignee | Babaco Research, Inc.<br>North Arlington, N.J. |

[54] AUTOMOBILE THEFT ALARM
14 Claims, 3 Drawing Figs.

[52] U.S. Cl. .................................................. 340/63,
307/10 AT
[51] Int. Cl. ........................................... B60r 25/10
[50] Field of Search............................. 340/63, 64;
307/252, 305, 10 AT

[56] References Cited
UNITED STATES PATENTS

| 3,300,659 | 1/1967 | Watters | 307/94 |
| 3,335,291 | 8/1967 | Gutzwiller | 307/305 |
| 3,349,386 | 10/1967 | Zug | 340/249 |
| 3,422,398 | 1/1969 | Rubin | 340/63 |
| 3,446,991 | 5/1969 | Howell | 307/252 |

*Primary Examiner*—John W. Caldwell
*Assistant Examiner*—Robert J. Mooney
*Attorney*—James and Franklin ABSTRACT: An automobile theft alarm comprises a semiconductor switch in operative circuit arrangement with the battery of a vehicle and a warning device. When current is drawn from the battery due, for example, to the unauthorized opening of a car door, and the resulting energization of the courtesy light, a voltage signal is applied to the control terminal of the switch to actuate that switch, thereby to energize the warning device.

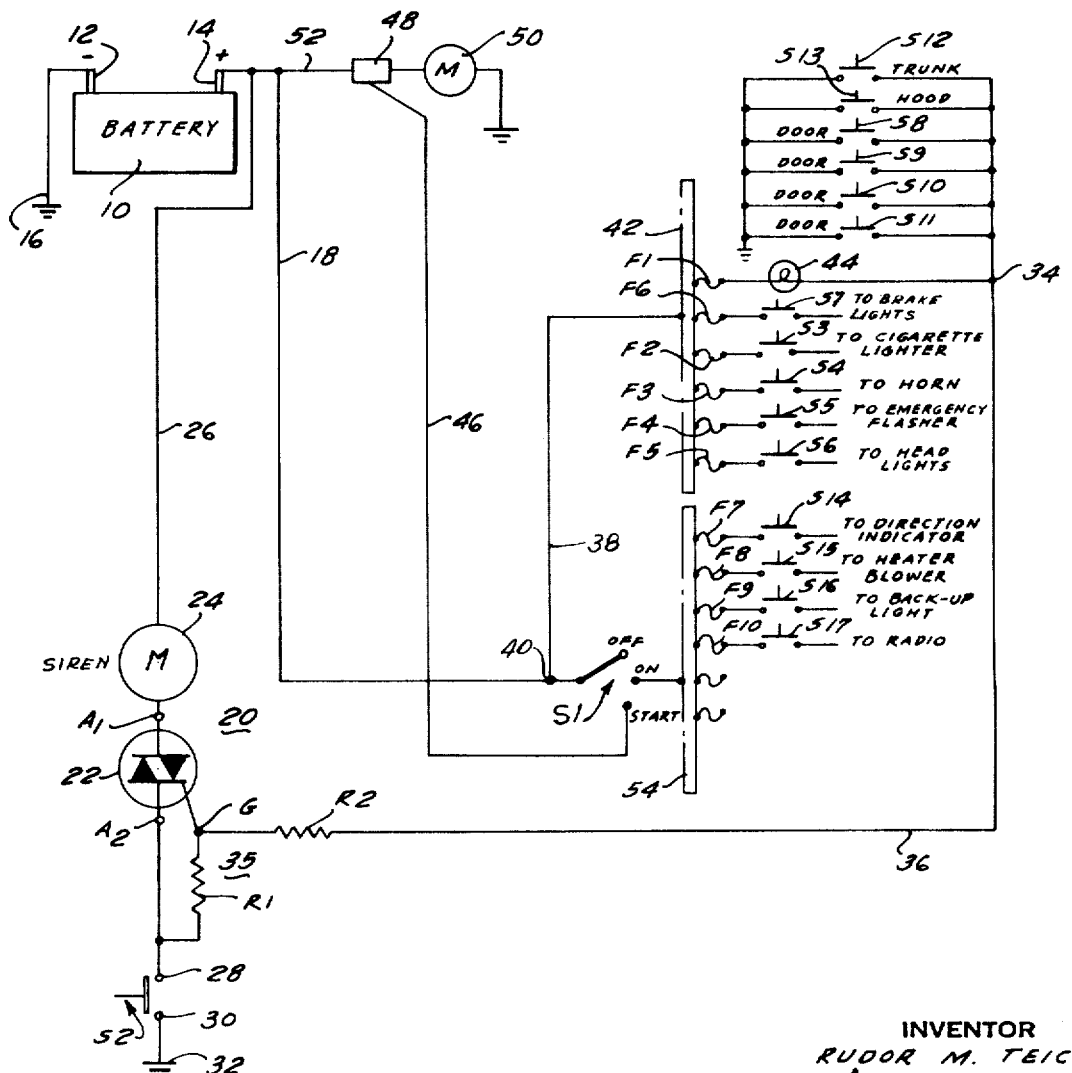

AUTOMOBILE THEFT ALARM

The present invention relates to warning devices, and particularly to a warning device for use on vehicles such as automobiles to indicate the unauthorized entry into or use of the vehicle.

The theft of automobiles and of property from parked automobiles represents one of the more significant areas of criminal activity. As the use of automobiles has increased, so has the incidence of thefts involving automobiles. The economic impact of automobile larceny is reflected in part in the increased rates of automobile insurance, and the disproportionate number of automobile accidents involving stolen automobiles in which the unauthorized drivers are often minors. It is also a common practice for thieves to forcibly enter a parked automobile to pilfer articles such as luggage and radios, and in the case of an automobile belonging to a doctor, as indicated by the license plate, medical bags hopefully, in the eyes of the thief, containing narcotics.

The provision of an alarm which would be actuated upon the unauthorized opening of the car door of the automobile, or the operation of any electrically controlled device in the automobile, would constitute an effective deterrent against thefts of this type. The sound of a wailing siren or horn would almost certainly upset the plans of the would-be car thief, and would quickly attract the attention of the police and others.

Alarms of this type have been proposed and are in widespread use on trucks carrying large quantities of goods often having considerable value. The warning alarm, which has as its main object the protection of the goods, generally comprises a plurality of switches which are responsive to the unauthorized opening of doors or the like, and which when actuated, energize a relay to in turn energize a warning device such as a siren. Apparatus of this type requires the installation of a large number of components in the vehicle, such as the switches, relays, etc., and as a result, the cost of purchasing and installing such apparatus is generally high. Owners and operators of trucks are usually willing and able to pay this cost because the potential saving in insurance costs, and the increased protection of their customers' products and the accompanying customer goodwill, make the cost of a warning device of this type well worth while despite the high cost.

The acceptance and use of such warning devices by owners of automobiles has, however, been greatly limited, largely as a result of the high initial purchase cost and the difficulty of installation. The known alarm devices adapted for use in automobiles have the further drawback of being not always reliable, and in that the failure of the device often results in the failure of the automobile's electrical system. Some known devices require a period of time between the unlawful entry and the time at which the warning alarm is sounded. During this period the knowledgeable thief could deactivate the alarm before or only shortly after it is energized, or he could abscond with the stolen goods before the alarm is energized.

It is an object of the present invention to provide an automobile theft alarm which requires a reduced number of components, and which is less expensive to purchase, and easier to install, than was heretofore possible.

It is another object of the present invention to provide an automobile theft alarm which is operatively connected in the battery circuit of the automobile, and is actuated in response to the unauthorized use of that battery.

It is also an object of the present invention to provide a theft alarm for use in a vehicle which is activated by the unlawful entry into that vehicle even though the vehicle's engine is not started, and the vehicle remains in its parked position.

It is yet another object of the present invention to provide an automobile theft warning device which is incorporated into the electrical system of the automobile in a manner such that failure of the warning device does not adversely affect the said electrical system.

It is still a further object of the present invention to provide an automobile theft warning device which is energized by the automobile's battery, and which is substantially unaffected by variations in the battery supply voltage.

It is a further object of the present invention to provide an automobile theft warning device which provides a clear and practically instantaneous indication of the unauthorized use of the automobile.

It is also an object of the present invention to provide a rapid and reliable theft alarm system which makes use of a small number of inexpensive components having few moving parts, and which therefore has long periods of trouble-free operation, which is readily and inexpensively installed in the vehicle, and which has no noticeable effect on the vehicle when the vehicle is being lawfully used.

It is still another object of the present invention to provide an automobile theft alarm in which many of the switches which energize the alarm are those switches commonly provided in the automobile.

To these ends the present invention provides a vehicle theft alarm which comprises a semiconductor switch device in circuit arrangement with the automobile battery and with a warning device. The semiconductor switch is actuated to energize the warning device by a voltage signal generated in the battery circuit whenever there is a sudden change in the current drawn from the battery. Such a change in current flow will occur, for example, when the automobile door is opened and the courtesy light is energized, or when the starting motor solenoid is energized by the closing of the ignition switch.

Thus, the unauthorized actuation of one or more of the electrical circuits conventionally provided in the vehicle is effective to produce a voltage signal which serves to actuate the semiconductor switch device, thereby to energize the warning device.

The semiconductor switching device is preferably a "triac." This is a silicon controlled rectifier having two oppositely poled semiconductor switching elements, so that it is conductive when either a positive or negative pulse is applied to its control terminal. A conventional SCR may be employed with additional means being provided for reversing the polarity of the voltage control signal applied to its gate. A manually actuatable switch, accessible from the outside of the vehicle, is provided to enable the alarm when desired, and to deactivate the alarm prior to use of the vehicle by the lawful user.

If desired, an additional switch or switches may be placed under the hood, or in the trunk of the vehicle, if one is not already provided there. That switch is operatively connected in the battery circuit so that when the trunk and/or hood is unlawfully opened, the switch is actuated to make the semiconductor switch conductive, thereby energizing the warning device.

The foregoing and additional features are described in the following detailed specification, which is accompanied by drawings in which:

FIG. 1 is an elevation of an automobile in which the theft alarm of the present invention is installed;

FIG. 2 is an electrical circuit diagram of the theft alarm system of the present invention incorporated in a typical automobile electrical system; and FIG. 3 is a fragmentary circuit diagram corresponding to the lower left corner of FIG. 2, and showing an alternative semiconductor switching arrangement for use in the theft alarm circuit.

The present invention provides a vehicle theft alarm which is operatively connected into the electrical system of the vehicle. The alarm is energized to provide an instantaneous and pronounced indication of an unauthorized use of the automobile in which an electrically controlled device in the vehicle, such as the courtesy lights, starting motor, or the like, is actuated. That actuation causes a drain of current from the vehicle's battery, which causes a voltage drop across the battery circuit. That voltage drop in turn is used as a voltage signal applied to the control terminal of a semiconductor switching device which is in circuit arrangement with the alarm and the battery. When the switching device is actuated in response to the voltage signal at its control terminal, the alarm is energized to provide the desired indication of unauthorized use. The alarm circuit can be deactivated when desired by the rightful user of the vehicle so that the alarm is energized only upon the unauthorized operation of that vehicle.

FIG. 2 illustrates a typical electrical system employed in a vehicle such as an automobile, truck, or the like. That system comprises a battery 10 which conventionally produces a voltage of approximately 12 volts across a cathode terminal 12 and an anode terminal 14. Terminal 12 is connected to electrical ground at 16, and terminal 14 is connected through lead 18 to an ignition switch S1 manually operable between "OFF," "ON" and "START" positions.

Battery 10 supplies the necessary electrical energy to operate the vehicle's starting system, as well as the many safety and convenience devices commonly provided in the vehicle, such as courtesy lights, head lights, horn, etc. The theft alarm of this invention is operatively connected to the circuit of battery 10 at a circuit point associated with one of these devices, and as herein specifically disclosed, it is connected to the courtesy lamp circuit. It will be understood that other circuit connections of the theft warning device would prove equally satisfactory in operation.

The theft warning device, generally designated 20, may be installed under the hood of the vehicle (FIG. 1) and comprises, in the circuit of FIG. 2, a semiconductor switch means in the form of a triac 22 connected in series with a warning device, here shown as a siren 24, and through a lead 26 to the anode terminal 14 of battery 10. The triac is a three-terminal AC semiconductor switching device capable of causing conduction of a relatively high current between its two anode terminals A1 and A2 when a relatively small signal of either positive or negative polarity is applied to the gate terminal G.

Anode terminal A1 is connected to the motor winding of siren 24 and anode terminal A2 is connected to one contact 28 of a key actuated switch S2, the other contact 30 of which is connected to ground at 32. As shown in FIG. 1, key-actuated switch S2 is accessible from the outside of the vehicle, and is actuated (i.e. to connect contacts 28 and 30) by the rightful user of the automobile, to enable the warning system when he leaves the vehicle. Any subsequent or unauthorized use of the vehicle such as opening a door, hood, or trunk, or starting the engine, or operating one or more of the electrical devices in the vehicle, will energize the siren in the manner described below. When the rightful user returns to the vehicle, he deactivates (opens) switch S2 from the outside of the vehicle, thereby to disable the theft alarm system prior to his opening the door to enter the vehicle. Switch S2 is mounted on the vehicle at a location thereon, e.g. under the hood, at which the would-be burglar is unable to short circuit the switch without actuating the theft alarm.

A resistor R1 is connected between gate terminal G and switch contact 28, and a resistor R2 is connected between the gate terminal G and a point 34 in the circuit of battery 10 by a line 36. Resistors R1 and R2 define a voltage divider generally designated 35, between point 34, the gate terminal G of triac 22, and ground when switch S2 is closed. When switch S2 is closed a small current flows through resistors R1 and R2 to establish a biasing signal at the gate terminal which is insufficient to render triac 22 conductive, but which increases the sensitivity of the triac to subsequent increased voltage levels at the gate terminal.

When one or more of the electrically operated devices in the vehicle is energized during the unauthorized use of the vehicle, a voltage signal level is established at point 34 and is applied through voltage divider 35 to gate terminal G. When the signal level increases the gate potential by a sufficient amount, triac 22 is triggered into conduction and the full voltage of battery 10 is applied across the siren 24 to energize the latter, thereby providing a clear indication of unauthorized use of the vehicle.

In the circuit of battery 10, a lead 38 is connected to lead 18 at point 40, and to the input of a fuse panel 42 which comprises a plurality of fuses in respective series connection with several of the electrically operated devices commonly provided in an automobile. The connection of lead 38 to fuse panel 42 is independent of the position of switch S1. One of the fused connections to panel 42 is the courtesy lamp connection, which comprises a fuse F1 and a lamp 44 connected to fuse F1 and to point 34 which is, as described above, connected through the voltage divider 35 to the gate terminal G of triac 22. As shown, fuse panel 42 also comprises fuses F2—F6 which are respectively connected through switches S3—S7 to the cigarette lighter, horn, emergency flasher, head lights and brake lights of the vehicle.

Point 34 is also connected to switches S8—S11, one or more of these switches being activated or closed when one or more of the doors of the vehicle is opened, thereby to connect point 34 to ground and so energizing and lighting courtesy lamp 44. If desired, and as herein provided as shown in FIG. 1, additional switches S12 and S13 are also connected to point 34 and to ground, and are respectively provided in the interior of the trunk and the hood of the vehicle. These switches are activated upon the opening of the trunk and/or the hood, thereby to connect point 34 to ground and cause courtesy lamp 44 to light. In some automobiles a separate trunk light actuated upon the opening of a switch such as S12 is normally provided. For a vehicle of this type an additional trunk switch would not be provided and switch S12 would no longer be directly connected to point 34 as in FIG. 2, but would instead be connected to fuse panel 42.

Thus, when one of switches S8—S13 is closed, i.e. upon the unauthorized opening of a door, or the hood, or the trunk, additional current will suddenly flow from battery 10 through leads 18 and 38 and, through courtesy lamp 44. That additional current flow causes a voltage drop with respect to ground at point 34 due to the IR potential drop in these leads and in the other conductors in the battery circuit through which that current flows. As leads 18 and 38 are relatively long and usually have significant distributed inductance and capacitance values, that voltage drop will be transformed to a voltage transient having a relatively increased amplitude for a short duration, e.g. 1.0 volt for 1—3 microseconds. That signal, when applied to the gate terminal G of triac 22, is effective to trigger the latter into conduction, thereby energizing siren 24.

In a similar manner the actuation of any of switches S3—S7 draws an additional current from battery 10, which current flow is reflected as a voltage drop at point 40 and thus also at point 34, which as described above is applied to the gate terminal of triac 22 to cause the triac to be triggered into conduction and the siren 24 to operate.

Switches S3—S13 are effective when closed to energize siren 24 independently of the position of switch S1. To start the engine of the vehicle, switch S1 is momentarily moved past the "ON" position to the "START" position, and then returned to the "ON" position at which it remains as long as the engine is operating. When in the "START" position, switch S1 is effective to connect lead 46 and thus starting motor solenoid 48 to battery 10 to energize the latter, thereby to supply energy through lead 52 to starting motor 50.

The operation of switch S1 and solenoid 48 produces a relatively large transient voltage in the battery circuit which induces a correspondingly large negative transient signal in line 36. The latter signal is applied to the gate terminal G of triac 22 to trigger the latter and energize siren 24 as described above.

When switch S1 is returned to its "ON" position, a second fuse panel 54 comprising fuses F7—F10 is connected to battery 10, and enables the subsequent energization, upon the respective actuation of any of switches S14—S17, of additional devices such as the direction indicators, the heater-blower motor, the backup light, and the car radio. When one or more of these devices is energized, additional current is drawn from battery 10 and a voltage drop is developed at point 40, and as described above, at point 34, and at the gate terminal of triac 22, to trigger triac 22 into conduction, thereby to energize siren 24.

Thus, the unauthorized operation of one or more of the conventionally provided, electrically energized devices of the vehicle is effective to develop a voltage signal which is applied to the gate of a triac switch to actuate the triac and energize the warning siren so long as switch S2 is activated or closed to enable the system. It has been found that at 32° F. temperature, a voltage signal of approximately 1.0 volt having a duration of 1—3 microseconds is sufficient to trigger triac 22 into conduction. As noted above, the provision of resistive voltage divider 35 increases the sensitivity of the triac to the voltage signal by biasing the gate with respect to the anode terminal A. Suitable bias would be in the order of 0.3 volts to derive increased sensitivity without the risk of undesired triac actuation. The required triggering level decreases at elevated temperatures, and is independent of the voltage output of battery 10 because the triac responds to a voltage change, rather than to an absolute magnitude of voltage.

It will be understood that all the fuses and the switches, with the exception of switches S2 and S13 (and possibly switch S12) are all commonly provided in a conventional automobile so that the alarm of the present invention requires the addition of only a relatively small number of components. In addition to switches S2 and S13 (and switch S12 if not already provided) these components include siren 24, triac 20, resistors R1 and R2 and lead 36.

FIG. 3 illustrates an alternative embodiment of a semiconductor switching circuit for use in the theft alarm of this invention in which a silicon controlled rectifier (SCR) 56 is employed as the switching device of the system. The SCR 56 has an anode terminal 58 connected to siren 24 and a cathode terminal 60 connected to a contact of switch S2. When a positive voltage of an appropriate level is applied to the gate terminal 62 of SCR 56 the SCR will be rendered conductive and current will flow between its cathode and anode terminals, thereby energizing siren 24.

It will be recalled that upon the unauthorized use of an electrical device in the vehicle, a negative transient signal is developed at line 36 of the theft alarm system. To be operative to actuate SCR 56, that signal is inverted by a transistor 64 connected between line 36 and the gate 62 of SCR 56. A current limiting resistor R3 is connected in line 36 and to a junction point 66 to which a resistor R4 is also connected. Point 66 is connected to the base of transistor 64 and resistor R4 is connected to a point 68 and to the anode 58 of SCR 56 at point 70. A resistor R5 is connected between point 60 and the emitter of transistor 64 to provide along with resistor R4 a suitable operating condition for transistor 64. The collector of transistor 64 is connected to the gate 62 of SCR 56.

Thus the negative transient signal developed at line 36 is applied to the base of transistor 64 and an inverted or positive signal developed at the collector of that transistor is applied to the gate of SCR 64 to trigger the latter into conduction, thereby, as above, to energize the siren 24 to provide a warning of the unauthorized use of the vehicle.

It is believed that the method of constructing, assembling and use of my improved automobile theft alarm, as well as the advantages thereof, will be apparent from the foregoing detailed description. The alarm device is effective to provide a clear and substantially instantaneous indication of the unauthorized entry into, or use of a vehicle. The system is energized upon the actuation of a semiconductor switching device by a voltage transient signal developed during such unauthorized use as a result of the additional use of the battery caused thereby. When the switching device is rendered conductive in this manner, a warning device is energized to provide the desired indication. While that warning device has been herein specifically described as a siren, other electrically controlled devices such as a horn, a bell, a whistle or the like could be used with equal effect. If desired, the warning device may be the horn already provided in the automobile. While the alarm disabling switch S2 has been herein specifically described as being key actuated, it may readily be actuated from the outside of the automobile by means such as a combination lock, or the like.

The alarm system of this invention does not require the use of bulky and expensive mechanical components such as relays as was heretofore required in systems of this type, and as a result is more reliable in use, less expensive to purchase, and easier to install in the vehicle. As rapid response of the triac to the voltage transient signal is desirable, use can be made of triacs which would ordinarily be considered as being of low quality. As a result, system costs are further reduced. These factors encourage the use of theft alarm system in privately owned automobiles and reduce the incidence of automobile thefts.

It will also be understood that while the improved automobile theft alarm has been described in several preferred forms, additional changes may be made without departing from the scope of the described invention.

I claim:

1. An alarm for indicating the unauthorized use of a vehicle of the type having a voltage source having first and second terminals at first and second different voltage levels, at least one load device, first switch means and means connecting said load device and said first switch means in series across said voltage source whereby said first switch means is effective when actuated to operatively connect said load device across said voltage source to cause a supply of current to flow through said load device, said alarm comprising, warning means, voltage-sensitive semiconductor switch means in operative circuit arrangement with said warning means and effective when actuated to energize the latter, said semiconductor switch means having a control terminal, and means operatively connected to said control terminal and said voltage source and effective, when said first switch means is unactuated to provide a conductive charging path from said first terminal of said voltage source to said control terminal to charge said control terminal substantially to said first voltage level and when said first switch means is actuated to develop a voltage signal at said control terminal at a level different from said first voltage level in response to the current flow through said load device to actuate said semiconductor switch means, thereby to energize said warning means, and manually actuatable disabling switch means accessible from the outside of said vehicle and operatively connected to said semiconductor switch means and effective when actuated to disable said alarm irrespective of the condition of said first switch means.

2. An alarm as defined in claim 1, in which said semiconductor switch means comprises a triac.

3. An alarm as defined in claim 1, in which said semiconductor switch means comprises a silicon controlled rectifier, and comprising means operatively connected to said gate terminal for reversing the polarity of said voltage signal.

4. An alarm as defined in claim 1, in which said device is the automobile starting motor, said first switch means comprising the ignition switch.

5. An alarm as defined in claim 1, in which said device is a courtesy light of said vehicle, said first switch means being actuated upon the opening of a door of said vehicle.

6. An alarm as defined in claim 1, said vehicle having a hood, said first switch means comprising a switch actuated upon the opening of said hood.

7. An alarm as defined in claim 6, said vehicle having a trunk, said first switch means further comprising a switch actuated upon the opening of said trunk.

8. An alarm as defined in claim 6, in which said hood actuated switch is operatively connected to said courtesy light and is effective when actuated upon the unauthorized opening of the hood to operate said courtesy light.

9. An alarm as defined in claim 7, in which said trunk actuated switch and said hood actuated switch are both operatively connected to said courtesy light, and effective when either is actuated to operate said courtesy light.

10. An alarm as defined in claim 1, said vehicle having a trunk, said first switch means comprising a switch actuated upon the opening of said trunk.

11. An alarm as defined in claim 1, comprising means for establishing a bias signal on said control terminal ineffective to actuate said semiconductor switch means but effective to increase the sensitivity of said semiconductor switch means to said voltage signal.

12. An alarm as defined in claim 2, comprising means for establishing a bias signal on said control terminal ineffective to actuate said semiconductor switch means but effective to increase the sensitivity of said semiconductor switch means to said voltage signal.

13. An alarm as defined in claim 1, in which said disabling switch means comprises a key actuated switch.

14. An alarm device as defined in claim 1, in which said electrically controlled device and said first switch means are the ones commonly provided in a conventional automobile.